US012456919B2

(12) United States Patent
Chan

(10) Patent No.: US 12,456,919 B2
(45) Date of Patent: Oct. 28, 2025

(54) BOOST CONVERTER WITH FUNCTION OF TEMPERATURE ADJUSTMENT

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 272 days.

(21) Appl. No.: 18/485,618

(22) Filed: Oct. 12, 2023

(65) Prior Publication Data
US 2025/0038651 A1 Jan. 30, 2025

(30) Foreign Application Priority Data
Jul. 24, 2023 (TW) .................. 112127469

(51) Int. Cl.
H02M 1/32 (2007.01)
H02M 1/00 (2006.01)
H02M 3/156 (2006.01)
H02M 3/157 (2006.01)
H02M 3/158 (2006.01)

(52) U.S. Cl.
CPC ......... *H02M 1/327* (2021.05); *H02M 1/0025* (2021.05); *H02M 3/156* (2013.01); *H02M 3/157* (2013.01); *H02M 3/158* (2013.01)

(58) Field of Classification Search
CPC .... H02M 1/327; H02M 1/0025; H02M 3/156; H02M 3/157; H02M 3/158
See application file for complete search history.

(56) References Cited

U.S. PATENT DOCUMENTS

| 7,729,140 | B2 | 6/2010 | Ying et al. | |
| 9,712,055 | B1* | 7/2017 | Swartz | H02M 3/158 |
| 9,865,426 | B2 | 1/2018 | Tran et al. | |
| 10,396,653 | B2 | 8/2019 | Lijima | |
| 2023/0088076 | A1* | 3/2023 | Casci | H05K 7/20845 |
| | | | | 701/22 |

(Continued)

FOREIGN PATENT DOCUMENTS

| TW | 200840192 A | 10/2008 |
| TW | 201345833 A | 11/2013 |

OTHER PUBLICATIONS

Chinese language office action dated Mar. 6, 2024, issued in application No. TW 112127469.

*Primary Examiner* — Monica Lewis
*Assistant Examiner* — Lakaisha Jackson
(74) *Attorney, Agent, or Firm* — McClure, Qualey & Rodack, LLP

(57) ABSTRACT

A boost converter with the function of temperature adjustment includes a bridge rectifier, a first inductor, an absorption circuit, a power switch element, an output stage circuit, a feedback compensation circuit, and a detection and control circuit. The absorption circuit is coupled in parallel with the first inductor. The absorption circuit is selectively enabled or disabled according to the control voltage. The power switch element selectively couples the first inductor to the ground voltage according to the PWM (Pulse Width Modulation) voltage. The detection and control circuit generates the control voltage and adjusts the duty cycle of the PWM voltage according to a temperature-dependent voltage. The temperature-dependent voltage is related to the temperature of the first inductor.

15 Claims, 5 Drawing Sheets

(56) References Cited

U.S. PATENT DOCUMENTS

| | | | |
|---|---|---|---|
| 2023/0098740 A1* | 3/2023 | Asai | H02J 50/20 307/142 |
| 2023/0336079 A1* | 10/2023 | Chan | H02M 1/0025 |
| 2025/0175087 A1* | 5/2025 | Chan | H02M 3/33569 |

* cited by examiner

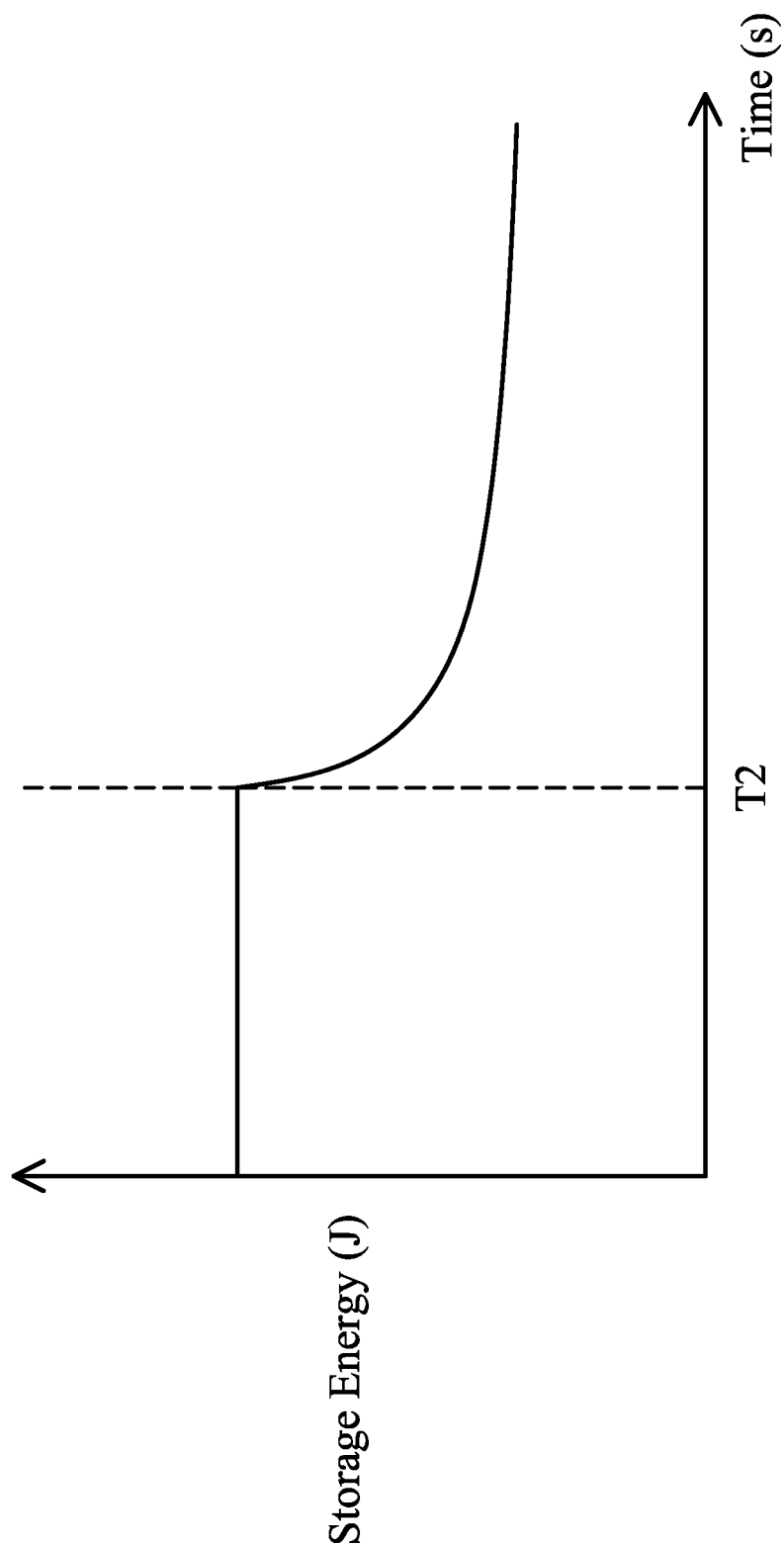

US 12,456,919 B2

BOOST CONVERTER WITH FUNCTION OF TEMPERATURE ADJUSTMENT

CROSS REFERENCE TO RELATED APPLICATIONS

This application claims priority of Taiwan Patent Application No. 112127469 filed on Jul. 24, 2023, the entirety of which is incorporated by reference herein.

BACKGROUND OF THE INVENTION

Field of the Invention

The disclosure generally relates to a boost converter, and more specifically, to a boost converter with the function of temperature adjustment.

Description of the Related Art

Boost converters are indispensable elements in the field of notebook computers. However, if the internal temperature of a boost converter is too high, it will tend to degrade the overall operational performance of the notebook computer. Accordingly, there is a need to propose a novel solution for solving this problem of the prior art.

BRIEF SUMMARY OF THE INVENTION

In an exemplary embodiment, the invention is directed to a boost converter with the function of temperature adjustment. The boost converter includes a bridge rectifier, a first inductor, an absorption circuit, a power switch element, an output stage circuit, a feedback compensation circuit, and a detection and control circuit. The bridge rectifier generates a rectified voltage according to a first input voltage and a second input voltage. The first inductor receives the rectified voltage. The absorption circuit is coupled in parallel with the first inductor. The absorption circuit is selectively enabled or disabled according to the control voltage. The power switch element selectively couples the first inductor to the ground voltage according to a PWM (Pulse Width Modulation) voltage. The output stage circuit is coupled to the first inductor, and is configured to generate an output voltage. The feedback compensation circuit generates a feedback voltage according to the output voltage. The detection and control circuit generates the PWM voltage according to the feedback voltage. The detection and control circuit also generates the control voltage and adjusts the duty cycle of the PWM voltage according to a temperature-dependent voltage. The temperature-dependent voltage is related to the temperature of the first inductor.

BRIEF DESCRIPTION OF DRAWINGS

The invention can be more fully understood by reading the subsequent detailed description and examples with references made to the accompanying drawings, wherein:

FIG. 5 is a diagram of operational characteristics of a first inductor when a boost converter is switched from a normal mode into a second cooling mode, according to an embodiment of the invention.

DETAILED DESCRIPTION OF THE INVENTION

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
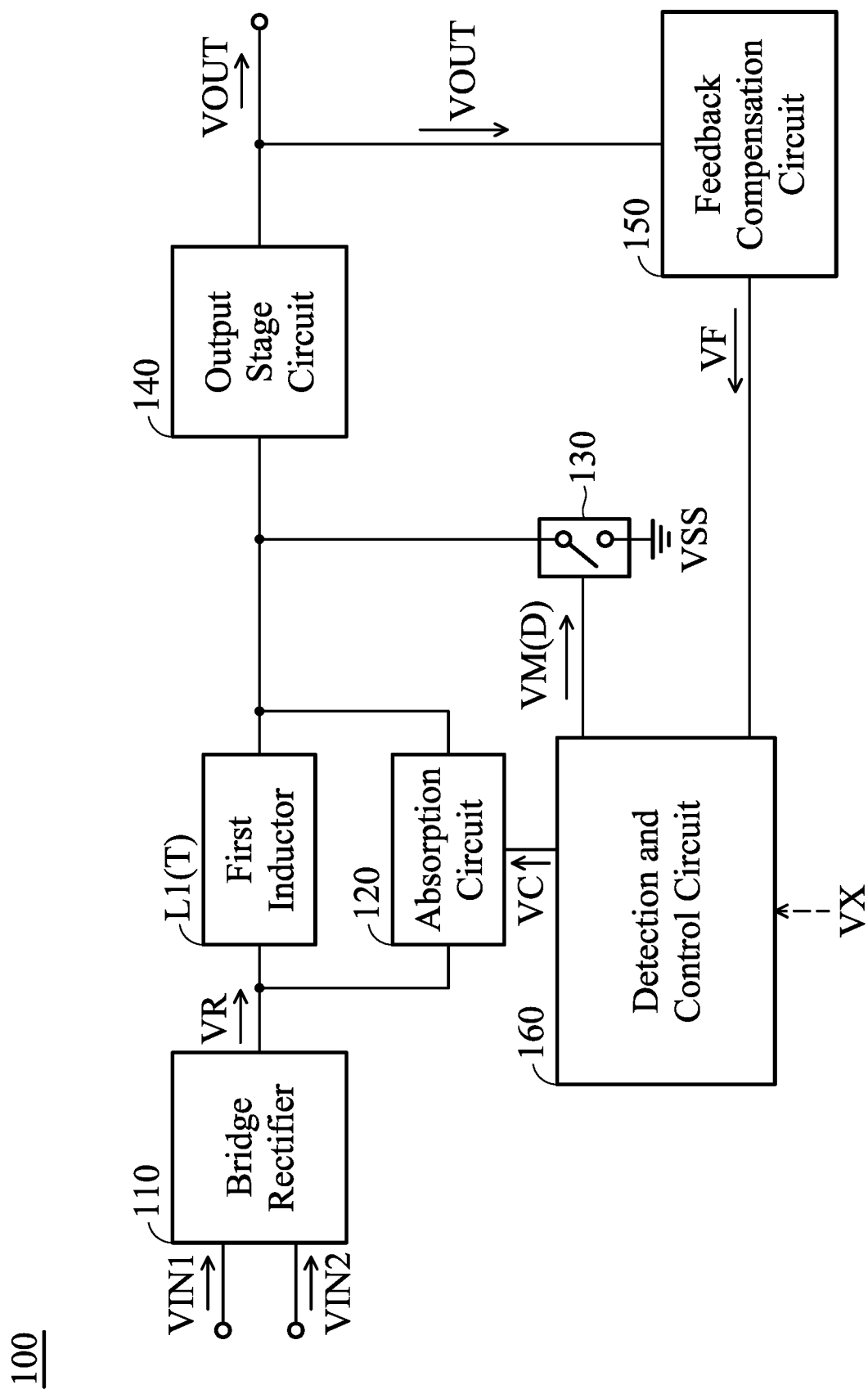
FIG. 1 is a diagram of a boost converter according to an embodiment of the invention.

FIG. 1 is a diagram of a boost converter 100 according to an embodiment of the invention. For example, the boost converter 100 may be applied to a desktop computer, a notebook computer, or an all-in-one computer. As shown in FIG. 1, the boost converter 100 includes a bridge rectifier 110, a first inductor L1, an absorption circuit 120, a power switch element 130, an output stage circuit 140, a feedback compensation circuit 150, and a detection and control circuit 160. It should be noted that the boost converter 100 may further include other components, such as a voltage regulator and/or a negative feedback circuit, although they are not displayed in FIG. 1.

The bridge rectifier 110 generates a rectified voltage VR according to a first input voltage VIN1 and a second input voltage VIN2. An AC (Alternating Current) voltage difference with any frequency and any magnitude may be formed between the first input voltage VIN1 and the second input voltage VIN2. For example, the frequency of the AC voltage difference may be about 50 Hz or 60 Hz, and the RMS (Root-Mean-Square) value of the AC voltage difference may be substantially from 90V to 264V, but they are not limited thereto. The first inductor L1 receives the rectified voltage VR. The absorption circuit 120 is coupled in parallel with the first inductor L1. The absorption circuit 120 is selectively enabled or disabled according to the control voltage VC. For example, if the absorption circuit 120 is enabled, it can absorb the energy from the first inductor L1, thereby reducing the temperature T of the first inductor L1. The power switch element 130 selectively couples the first inductor L1 to the ground voltage VSS (e.g., 0V) according to a PWM (Pulse Width Modulation) VM. For example, if the PWM voltage VM has a high logic level (i.e., a logic "1"), the power switch element 130 may couple the first inductor L1 to the ground voltage VSS (i.e., the power switch element 130 is similar to a short-circuited path). Conversely, if the PWM voltage VM has a low logic level (i.e., a logic "0"), the power switch element 130 may not couple the first inductor L1 to the ground voltage VSS (i.e., the power switch element 130 is similar to an open-circuited path). The output stage circuit 140 is coupled to the first inductor L1, and is configured to generate an output voltage VOUT. For example, the output voltage VOUT may be a DC (Direct Current) voltage, whose voltage level may be substantially from 360V to 440V, but it is not limited thereto. The feedback compensation circuit 150 generates a feedback voltage VF according to the output voltage VOUT. The detection and control circuit 160 generates the PWM voltage VM according to the feedback voltage VF. In addition, the detection and control circuit 160 generates the control voltage VC and adjusts the duty cycle D of the PWM voltage VM according to a temperature-dependent voltage VX. The temperature-dependent voltage VX is related to the temperature T of the first inductor L1. Generally, after the temperature-dependent voltage VX is analyzed, the detection and control circuit 160 can fine-tune the temperature T of the first inductor L1 by using the control voltage VC and adjusting the PWM voltage VM, so as to effectively reduce the probability of the temperature T of the first inductor L1 being accidentally too high.

The following embodiments will introduce the detailed structure and operation of the boost converter 100. It should be understood these figures and descriptions are merely exemplary, rather than limitations of the invention.

Figure 2:
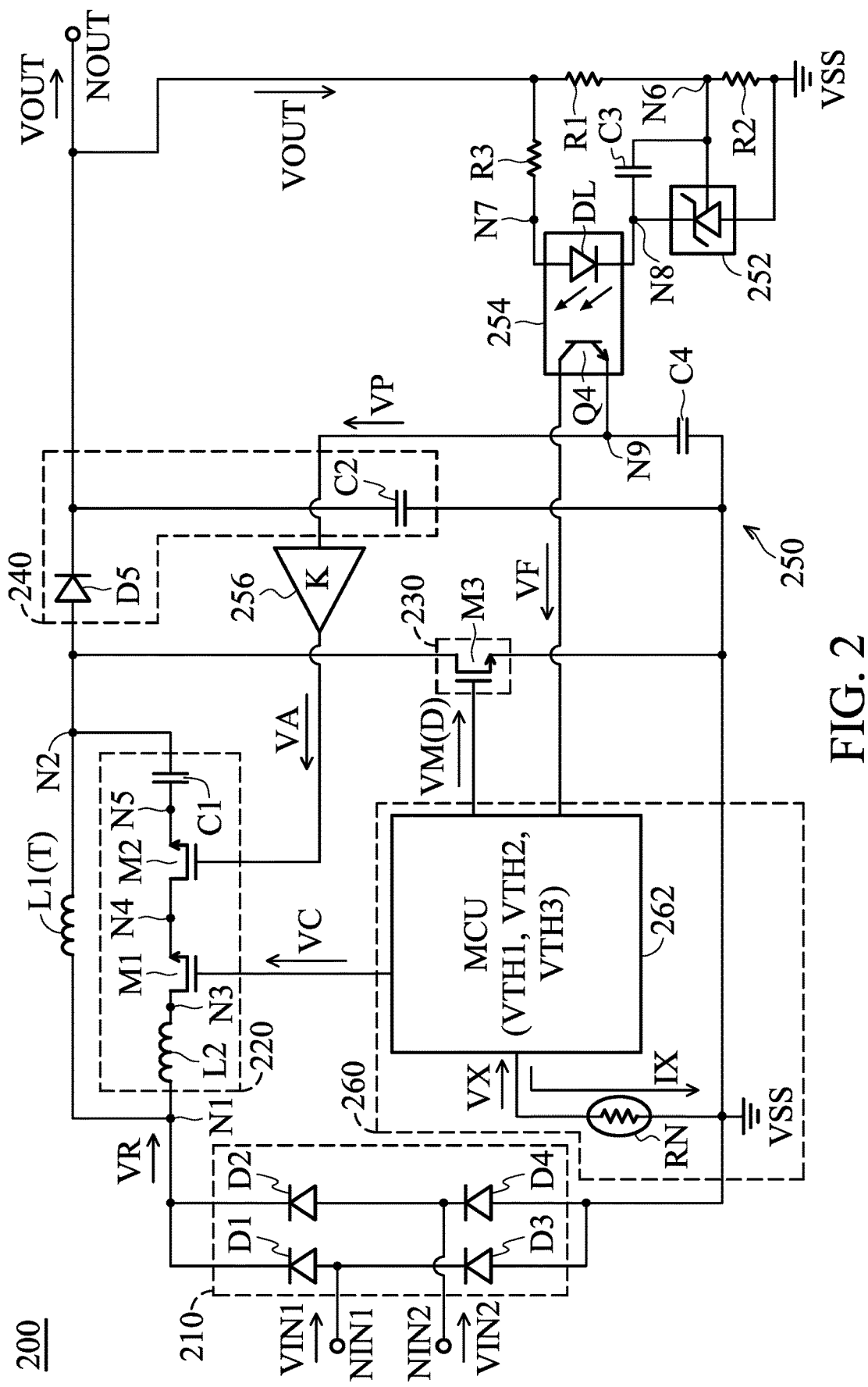
FIG. 2 is a diagram of circuitry of a boost converter according to an embodiment of the invention.

FIG. 2 is a diagram of circuitry of a boost converter 200 according to an embodiment of the invention. In the embodiment of FIG. 2, the boost converter 200 with a first input node NIN1, a second input node NIN2 and an output node NOUT includes a bridge rectifier 210, a first inductor L1, an absorption circuit 220, a power switch element 230, an output stage circuit 240, a feedback compensation circuit 250, and a detection and control circuit 260. The first input node NIN1 and the second input node NIN2 of the boost converter 200 are arranged for receiving a first input voltage VIN1 and a second input voltage VIN2 from an external input power source (not shown), respectively. The output node NOUT of the boost converter 200 is arranged for outputting an output voltage VOUT to a system end (not shown).

The bridge rectifier 210 includes a first diode D1, a second diode D2, a third diode D3, and a fourth diode D4. The first diode D1 has an anode coupled to the first input node NIN1, and a cathode coupled to a first node N1 for outputting a rectified voltage VR. The second diode D2 has an anode coupled to the second input node NIN2, and a cathode coupled to the first node N1. The third diode D3 has an anode coupled to the ground voltage VSS, and a cathode coupled to the first input node NIN1. The fourth diode D4 has an anode coupled to the ground voltage VSS, and a cathode coupled to the second input node NIN2.

The first inductor L1 has a first terminal coupled to the first node N1 for receiving the rectified voltage VR, and a second terminal coupled to a second node N2. In some embodiments, the first inductor L1 is considered as a boost inductor of the boost converter 200.

The absorption circuit 220 includes a first transistor M1, a second transistor M2, a second inductor L2, and a first capacitor C1. For example, each of the first transistor M1 and the second transistor M2 may be an NMOSFET (N-type Metal Oxide Semiconductor Field Effect Transistor). The second inductor L2 has a first terminal coupled to the first node N1, and a second terminal coupled to a third node N3.

The first transistor M1 has a control terminal (e.g., a gate) for receiving the control voltage VC, a first terminal (e.g., a source) coupled to a fourth node N4, and a second terminal (e.g., a drain) coupled to the third node N3. The second transistor M2 has a control terminal (e.g., a gate) for receiving an amplified voltage VA, a first terminal (e.g., a source) coupled to a fifth node N5, and a second terminal (e.g., a drain) coupled to the fourth node N4. The first capacitor C1 has a first terminal coupled to the fifth node N5, and a second terminal coupled to the second node N2.

The power switch element 230 includes a third transistor M3. For example, the third transistor M3 may be another NMOSFET. The third transistor M3 has a control terminal (e.g., a gate) for receiving a PWM voltage VM, a first terminal (e.g., a source) coupled to the ground voltage VSS, and a second terminal (e.g., a drain) coupled to the second node N2.

The output stage circuit 240 includes a fifth diode D5 and a second capacitor C2. The fifth diode D5 has an anode coupled to the second node N2, and a cathode coupled to the output node NOUT. The second capacitor C2 has a first terminal coupled to the output node NOUT, and a second terminal coupled to the ground voltage VSS.

In some embodiments, the feedback compensation circuit 250 includes a voltage regulator 252, a linear optical coupler 254, an amplifier 256, a third capacitor C3, a fourth capacitor C4, a first resistor R1, a second resistor R2, and a third resistor R3.

The first resistor R1 has a first terminal coupled to the output node NOUT for receiving the output voltage VOUT, and a second terminal coupled to a sixth node N6. The second resistor R2 has a first terminal coupled to the sixth node N6, and a second terminal coupled to the ground voltage VSS. The third resistor R3 has a first terminal coupled to a seventh node N7, and a second terminal coupled to the output node NOUT for receiving the output voltage VOUT. The third capacitor C3 has a first terminal coupled to an eighth node N8, and a second terminal coupled to the sixth node N6.

In some embodiments, the voltage regulator 252 is implemented with a TL431 electronic component. The voltage regulator 252 has an anode coupled to the ground voltage VSS, a cathode coupled to the eighth node N8, and a reference terminal coupled to the sixth node N6.

In some embodiments, the linear optical coupler 254 is implemented with a PC817 electronic component. The linear optical coupler 254 includes an LED (Light-Emitting Diode) DL and a BJT (Bipolar Junction Transistor) Q4 (e.g., NPN-type). The LED DL has an anode coupled to the seventh node N7, and a cathode coupled to the eighth node N8. The BJT Q4 has a collector for outputting the feedback voltage VF, and an emitter coupled to a ninth node N9.

In addition, the fourth capacitor C4 has a first terminal coupled to the ninth node N9 for outputting a capacitive voltage VP, and a second terminal coupled to the ground voltage VSS. The amplifier 256 generates the amplified voltage VA according to the capacitive voltage VP. The gain factor K of the amplifier 256 may be greater than 1. In some embodiments, the relationship between the amplified voltage VA and the capacitive voltage VP is described according to the following equation (1):

$$VA = K \cdot VP \qquad (1)$$

where "VA" represents the voltage level of the amplified voltage VA, "VP" represents the voltage level of the capacitive voltage VP, and "K" represents the gain factor K of the amplifier 256.

The detection and control circuit 260 includes an MCU (Microcontroller Unit) 262 and an NTC (Negative Temperature Coefficient) resistor RN.

The MCU 262 outputs a constant current IX. The constant current IX flows through the NTC resistor RN. The NTC resistor RN has a first terminal for outputting a temperature-dependent voltage VX, and a second terminal coupled to the ground voltage VSS. It should be noted that the NTC resistor RN is disposed adjacent to the first inductor L1, so as to receive the relative information of the temperature T of the first inductor L1. For example, the distance between the NTC resistor RN and the first inductor L1 may be shorter than or equal to 10 mm, but it is not limited thereto. In some embodiments, the temperature T of the first inductor L1 is also substantially equal to the whole temperature of the boost converter 200. According to Ohm's Law, the relationship between the temperature-dependent voltage VX and the constant current IX is described as the following equation (2):

$$VX = IX \cdot RN \quad (2)$$

where "VX" represents the voltage level of the temperature-dependent voltage VX, "IX" represents the current magnitude of the constant current IX, and "RN" represents the resistance of the NTC resistor RN.

Figure 3:
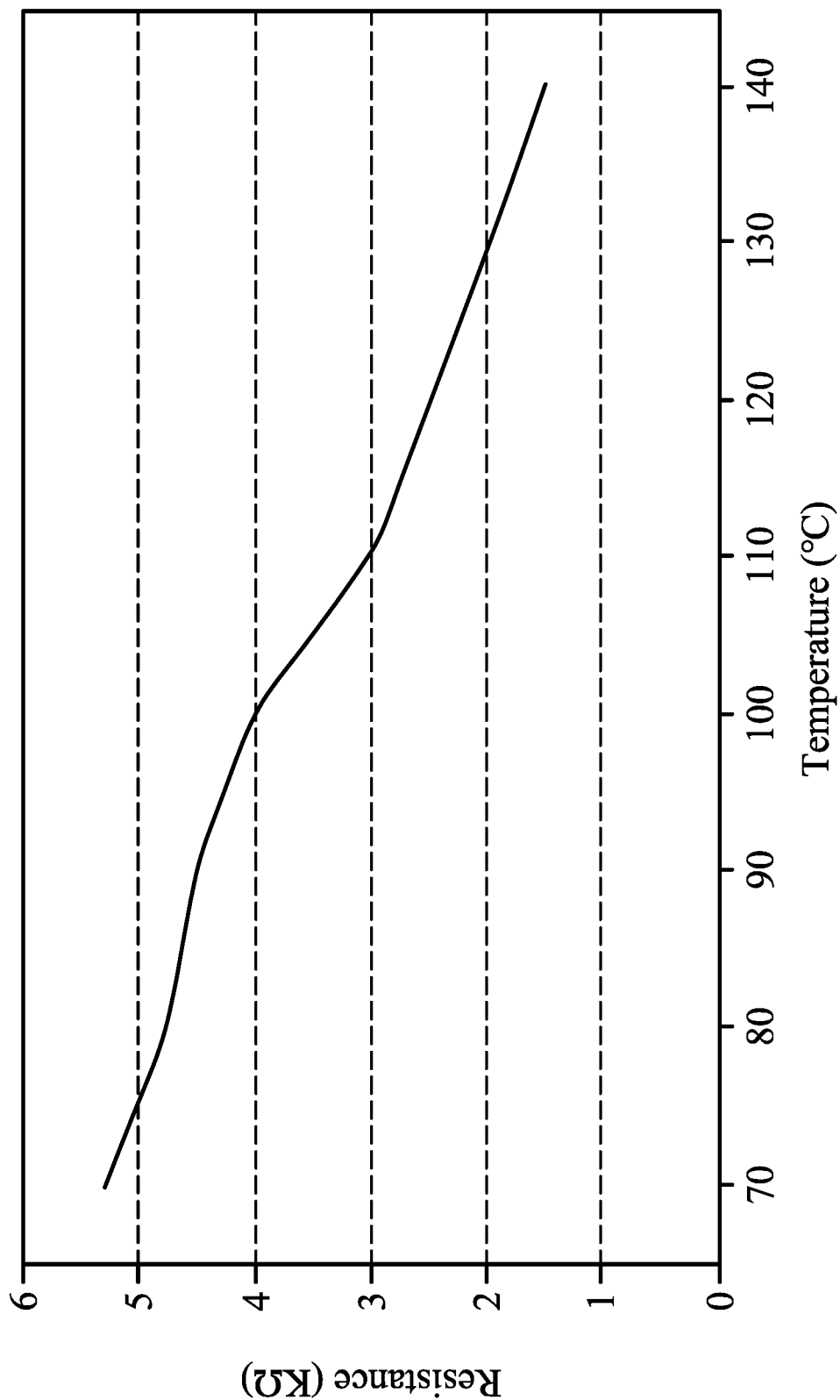
FIG. 3 is a diagram of operational characteristics of an NTC (Negative Temperature Coefficient) resistor according to an embodiment of the invention.

FIG. 3 is a diagram of operational characteristics of the NTC resistor RN according to an embodiment of the invention. The horizontal axis represents the temperature T (° C.) of the first inductor L1, and the vertical axis represents the resistance (KΩ) of the NTC resistor RN. According to the measurement of FIG. 3, if the temperature T of the first inductor L1 decreases, the resistance of the NTC resistor RN will become larger, and the temperature-dependent voltage VX will become higher. Conversely, if the temperature T of the first inductor L1 increases, the resistance of the NTC resistor RN will become smaller, and the temperature-dependent voltage VX will become lower. It should be understood that the diagram of the operational characteristics of FIG. 3 is merely exemplary, and the practical parameter of the NTC resistor RN is adjustable according to different requirements.

The MCU 262 generates the PWM voltage VM according to the feedback voltage VF. For example, the initial duty cycle D of the PWM voltage VM may be from 60% to 80%, but it is not limited thereto. Furthermore, the MCU 262 generates the control voltage VC and adjusts the duty cycle D of the PWM voltage VM according to the temperature-dependent voltage VX. In some embodiments, the MCU 262 compares the temperature-dependent voltage VX with a first threshold voltage VTH1, a second threshold voltage VTH2, and a third threshold voltage VTH3. The first threshold voltage VTH1 may be lower than the second threshold voltage VTH2. The second threshold voltage VTH2 may be lower than the third threshold voltage VTH3. Based on different comparison results, the MCU 262 may be operated in four modes as below, which will be described in the following embodiments.

In a normal mode, if the temperature-dependent voltage VX is higher than the third threshold voltage VTH3 (i.e., VX>VTH3), it can represent the temperature T of the first inductor L1 falls within a normal range. At this time, the MCU 262 outputs the control voltage VC with a low logic level for disabling the absorption circuit 220. Furthermore, the MCU 262 maintains the initial duty cycle D of the PWM voltage VM.

In a first cooling mode, if the temperature-dependent voltage VX is higher than the second threshold voltage VTH2 and is lower than or equal to the third threshold voltage VTH3 (i.e., VTH3≥VX>VTH2), it can represent the temperature T of the first inductor L1 is slightly high. At this time, the MCU 262 outputs the control voltage VC with the low logic level for disabling the absorption circuit 220. Also, the MCU 262 reduces the duty cycle D of the PWM voltage VM. For example, the duty cycle D of the PWM voltage VM may be reduced to 32%, but it is not limited thereto.

Figure 4:
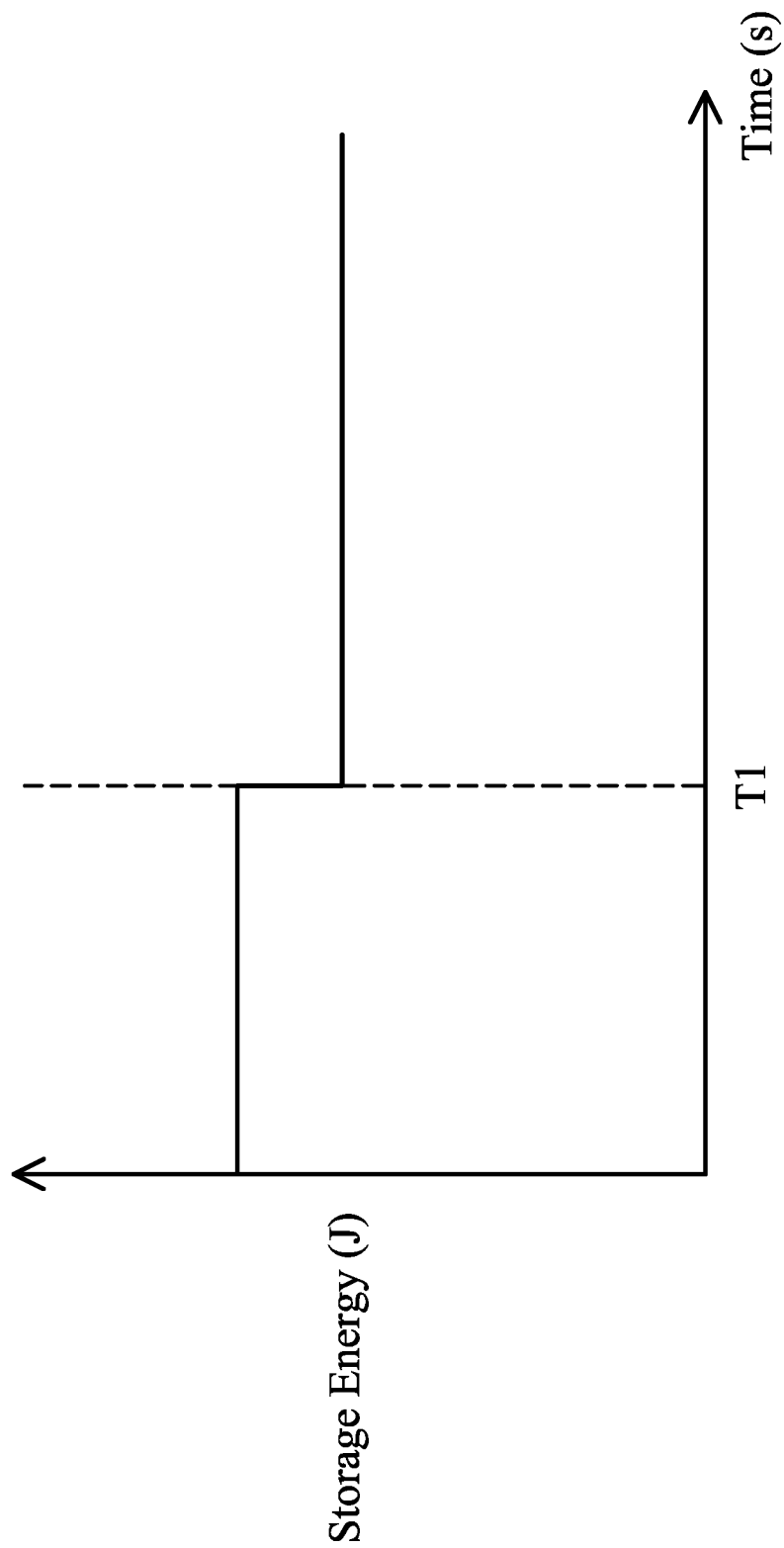
FIG. 4 is a diagram of operational characteristics of a first inductor when a boost converter is switched from a normal mode into a first cooling mode, according to an embodiment of the invention.

FIG. 4 is a diagram of operational characteristics of the first inductor L1 when the boost converter 200 is switched from the normal mode into the first cooling mode, according to an embodiment of the invention. The horizontal axis represents time(s), and the vertical axis represents the storage energy (J) of the first inductor L1. At a first time point T1, the boost converter 200 is switched from the normal mode into the first cooling mode. Since the duty cycle D of the PWM voltage VM is reduced, the storage energy of the first inductor L1 becomes less, and the temperature T of the first inductor L1 becomes lower.

In a second cooling mode, if the temperature-dependent voltage VX is higher than the first threshold voltage VTH1 and is lower than or equal to the second threshold voltage VTH2 (i.e., VTH2≥VX>VTH1), it can represent the temperature T of the first inductor L1 is relatively high. At this time, the MCU 262 outputs the control voltage VC with a high logic level for enabling the absorption circuit 220. It should be noted that because the amplified voltage VA is usually high enough to turn on the second transistor M2, the absorption circuit 220 is substantially selectively enabled or disabled according to the control voltage VC that is applied to the first transistor M1. Also, the MCU 262 reduces the duty cycle D of the PWM voltage VM. For example, the duty cycle D of the PWM voltage VM may be reduced to 32%, but it is not limited thereto.

FIG. 5 is a diagram of operational characteristics of the first inductor L1 when the boost converter 200 is switched from the normal mode into the second cooling mode, according to an embodiment of the invention. The horizontal axis represents time(s), and the vertical axis represents the storage energy (J) of the first inductor L1. At a second time point T2, the boost converter 200 is switched from the normal mode into the second cooling mode. Since the duty cycle D of the PWM voltage VM is reduced, the storage energy of the first inductor L1 becomes less. On the other hand, the first inductor L1 can resonate with the second inductor L2 and the first capacitor C1 of the absorption circuit 220, such that the absorption circuit 220 can fast absorb the energy from the first inductor L1. Therefore, the temperature T of the first inductor L1 significantly becomes lower.

In a protection mode, if the temperature-dependent voltage VX is lower than or equal to the first threshold voltage VTH1 (i.e., VTH1≥VX), it can represent the temperature T of the first inductor L1 is very high. At this time, the MCU 262 triggers an OTP (Over Temperature Protection) mechanism. For example, the MCU 262 may stop outputting the PWM voltage VM, such that the output voltage VOUT of the boost converter 200 can finally drop to 0.

In conclusion, the four operational modes of the boost converter 200 will be described as the following Table I:

TABLE I

Four Operational Modes of Boost Converter

| | Temperature- Dependent Voltage VX | | | |
|---|---|---|---|---|
| | VX > VTH3 | VTH3 ≥ VX > VTH2 | VTH2 ≥ VX > VTH1 | VTH1 ≥ VX |
| Operational Mode of Boost Converter | Normal Mode | First Cooling Mode | Second Cooling Mode | Protection Mode |

The invention proposes a novel boost converter with a function of temperature adjustment. According to practical measurements, the boost converter using the above design can prevent the temperature of its internal elements from being too high, and therefore it is suitable for application in a variety of devices.

Note that the above voltages, currents, resistances, inductances, capacitances and other element parameters are not limitations of the invention. A designer can adjust these settings according to different requirements. The boost converter of the invention is not limited to the configurations of FIGS. 1-5. The invention may merely include any one or more features of any one or more embodiments of FIGS. 1-5. In other words, not all of the features displayed in the figures should be implemented in the boost converter of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. A boost converter with a function of temperature adjustment, comprising:
   a bridge rectifier, generating a rectified voltage according to a first input voltage and a second input voltage;
   a first inductor, receiving the rectified voltage;
   an absorption circuit, coupled in parallel with the first inductor, wherein the absorption circuit is selectively enabled or disabled according to a control voltage;
   a power switch element, selectively coupling the first inductor to a ground voltage according to a PWM (Pulse Width Modulation) voltage;
   an output stage circuit, coupled to the first inductor, and generating an output voltage;
   a feedback compensation circuit, generating a feedback voltage according to the output voltage; and
   a detection and control circuit, generating the PWM voltage according to the feedback voltage;
   wherein the detection and control circuit generates the control voltage and adjusts a duty cycle of the PWM voltage according to a temperature-dependent voltage; wherein the temperature-dependent voltage is related to a temperature of the first inductor.

2. The boost converter as claimed in claim 1, wherein the bridge rectifier comprises:
   a first diode, wherein the first diode has an anode coupled to a first input node for receiving the first input voltage, and a cathode coupled to a first node for outputting the rectified voltage;
   a second diode, wherein the second diode has an anode coupled to a second input node for receiving the second input voltage, and a cathode coupled to the first node;
   a third diode, wherein the third diode has an anode coupled to the ground voltage, and a cathode coupled to the first input node; and
   a fourth diode, wherein the fourth diode has an anode coupled to the ground voltage, and a cathode coupled to the second input node;
   wherein the first inductor has a first terminal coupled to the first node, and a second terminal coupled to a second node.

3. The boost converter as claimed in claim 2, wherein the absorption circuit comprises:
   a second inductor, wherein the second inductor has a first terminal coupled to the first node, and a second terminal coupled to a third node;
   a first transistor, wherein the first transistor has a control terminal for receiving the control voltage, a first terminal coupled to a fourth node, and a second terminal coupled to the third node;
   a second transistor, wherein the second transistor has a control terminal for receiving an amplified voltage, a first terminal coupled to a fifth node, and a second terminal coupled to the fourth node; and
   a first capacitor, wherein the first capacitor has a first terminal coupled to the fifth node, and a second terminal coupled to the second node.

4. The boost converter as claimed in claim 3, wherein the power switch element comprises:
   a third transistor, wherein the third transistor has a control terminal for receiving the PWM voltage, a first terminal coupled to the ground voltage, and a second terminal coupled to the second node.

5. The boost converter as claimed in claim 3, wherein the output stage circuit comprises:
   a fifth diode, wherein the fifth diode has an anode coupled to the second node, and a cathode coupled to an output node for outputting the output voltage; and
   a second capacitor, wherein the second capacitor has a first terminal coupled to the output node, and a second terminal coupled to the ground voltage.

6. The boost converter as claimed in claim 5, wherein the feedback compensation circuit comprises:
   a first resistor, wherein the first resistor has a first terminal coupled to the output node for receiving the output voltage, and a second terminal coupled to a sixth node;
   a second resistor, wherein the second resistor has a first terminal coupled to the sixth node, and a second terminal coupled to the ground voltage;
   a third resistor, wherein the third resistor has a first terminal coupled to a seventh node, and a second terminal coupled to the output node; and
   a third capacitor, wherein the third capacitor has a first terminal coupled to an eighth node, and a second terminal coupled to the sixth node.

7. The boost converter as claimed in claim 6, wherein the feedback compensation circuit further comprises:
   a voltage regulator, wherein the voltage regulator has an anode coupled to the ground voltage, a cathode coupled to the eighth node, and a reference terminal coupled to the sixth node.

8. The boost converter as claimed in claim 7, wherein the feedback compensation circuit further comprises:
   a linear optical coupler, comprising an LED (Light-Emitting Diode) and a BJT (Bipolar Junction Transistor), wherein the LED has an anode coupled to the seventh node, and a cathode coupled to the eighth node, and wherein the BJT has a collector for outputting the feedback voltage, and an emitter coupled to a ninth node.

9. The boost converter as claimed in claim 8, wherein the feedback compensation circuit further comprises:
   a fourth capacitor, wherein the fourth capacitor has a first terminal coupled to the ninth node for outputting a capacitive voltage, and a second terminal coupled to the ground voltage; and
   an amplifier, generating the amplified voltage according to the capacitive voltage.

10. The boost converter as claimed in claim 1, wherein the detection and control circuit comprises:
    an NTC (Negative Temperature Coefficient) resistor, disposed adjacent to the first inductor.

11. The boost converter as claimed in claim 10, wherein the NTC resistor has a first terminal for outputting the temperature-dependent voltage, and a second terminal coupled to the ground voltage.

12. The boost converter as claimed in claim 10, wherein the detection and control circuit further comprises:
    an MCU (Microcontroller Unit), outputting a constant current, wherein the constant current flows through the NTC resistor;
    wherein the MCU generates the control voltage and adjusts the duty cycle of the PWM voltage according to the feedback voltage and the temperature-dependent voltage.

13. The boost converter as claimed in claim 12, wherein if the temperature-dependent voltage is lower than or equal to a first threshold voltage, the MCU triggers an OTP (Over Temperature Protection) mechanism.

14. The boost converter as claimed in claim 12, wherein if the temperature-dependent voltage is higher than the first threshold voltage and is lower than or equal to a second threshold voltage, the MCU outputs the control voltage with a high logic level and reduces the duty cycle of the PWM voltage.

15. The boost converter as claimed in claim 12, wherein if the temperature-dependent voltage is higher than the second threshold voltage and is lower than or equal to a third threshold voltage, the MCU outputs the control voltage with a low logic level and reduces the duty cycle of the PWM voltage.

* * * * *